E. B. STIMPSON.
TIRE PROTECTIVE RIVET.
APPLICATION FILED JAN. 28, 1908.

1,091,981.

Patented Mar. 31, 1914.

Witnesses:

Inventor
Edwin B. Stimpson
By his Attorney
Frank J. Kent

UNITED STATES PATENT OFFICE.

EDWIN BALL STIMPSON, OF BROOKLYN, NEW YORK, ASSIGNOR TO EDWIN B. STIMPSON COMPANY, A CORPORATION OF NEW YORK.

TIRE-PROTECTIVE RIVET.

1,091,981. Specification of Letters Patent. Patented Mar. 31, 1914.

Application filed January 28, 1908. Serial No. 412,968.

*To all whom it may concern:*

Be it known that I, EDWIN BALL STIMPSON, a citizen of the United States, and a resident of the borough of Brooklyn, county of Kings, and State of New York, have invented certain new and useful Improvements in Tire-Protective Rivets, of which the following is a specification.

The rivet of my present invention has various uses among which is its use to protect tires and prevent slipping and skidding. The features of construction by which it effects this, will appear from the drawings, also from the description.

Figure 1:
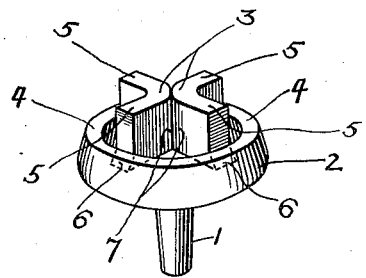
Figure 2:
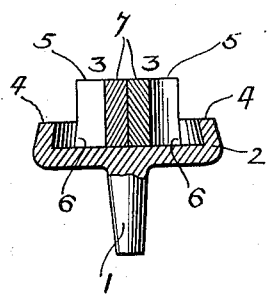

In the accompanying drawings, which show a form of rivet illustrative of my invention, Figure 1 is a view in perspective, showing such form of rivet; and Fig. 2 is view in elevation, partly broken away and partly in section, of the form of rivet shown in Fig. 1.

Similar reference characters refer to similar parts throughout the several views of the drawing.

Describing now my invention with particular reference to the form of rivet shown in Figs. 1 and 2, said rivet comprises a shank 1 and a cup or base member 2 and road-contacting members 3. In this rivet the shank 1 is integral with the base member 2 and the bent road-contacting members 3 are secured to the base member by engagement with inturned portions of the base member, as shown. In the base member shown, the inturned portions form a continuous rim 4 which together with the base portion constitute a cup-like member.

Each of the road-contacting members 3 comprises two plate-like members 5, each of said members 5, with the parts assembled, radiating substantially from a common center and disposed on edge so that they project from the cup or base member with radiating road-contacting edges. The elbow-portions 7 of each road-contacting member 3 are here arranged in adjacency as shown, the members 5 thus establishing a cruciform road-contacting surface.

The free ends of the plate-like members preferably broaden out toward the bottom as at 6 so that a more secure engagement against separation is had with the inturned portions of the base member.

The road-contacting member will ordinarily be of hardened steel to have great strength and wearing quality. The cup or base member may or may not be hardened.

It will be noted that the cup or base member protects the tire or fabric from the cutting action of the bottom edges of the road-contacting plates or strips. Also that the base member itself cannot injure the tire because its bottom rounds into its periphery on a curve adapted to prevent such injury. Thus from one point of view, the rivet of my present invention may be characterized as comprising a road-contacting member, a shank, and a base member interposed between the road-contacting member and the tire, the base member protecting the tire against being cut by the road-contacting member, and the last named member protecting the tire against wear from the road and preventing slipping and skidding, said member comprising a road-contacting strip or strips of hardened material extending across the face of the rivet. And it should be understood that whenever in this specification or in the appended claims a road-contacting strip or member is described as being "bent," there is meant a member which has a bend formed therein, but not necessarily a strip or member which has such a bend as the result of an actual bending operation, in other words, the bend might be established by casting the strip or member in a mold of suitable design.

Having thus described my invention, what I claim is:

1. A protective rivet comprising in combination a base, a bent strip resting on one of its bent edges on said base and secured in that position by portions of the base in contact with its ends, and a shank projecting below the base.

2. A protective rivet comprising in combination a cup, a pair of independent centrally bent strips assembled with their bent central portions located adjacently at the middle of the cup and with their sides radiating outwardly toward the periphery of the cup, one of the bent edges of each of said strips projecting from the cup in road-contacting position, said strips being secured in the above relation by the sides of the cup infolded against the ends of the strips, and a shank projecting below the base.

In witness whereof I have signed my name to the foregoing specification in the presence of two subscribing witnesses.

EDWIN BALL STIMPSON.

Witnesses:
 Jos. F. O'Brien,
 E. W. Schen, Jr.

Copies of this patent may be obtained for five cents each, by addressing the "Commissioner of Patents, Washington, D. C."